(12) United States Patent
Son et al.

(10) Patent No.: US 11,204,882 B2
(45) Date of Patent: Dec. 21, 2021

(54) ELECTRONIC DEVICE FOR CONTROLLING EXTERNAL CONVERSION DEVICE

(71) Applicant: Samsung Electronics Co., Ltd., Gyeonggi-do (KR)

(72) Inventors: Jehyun Son, Gyeonggi-do (KR); Jugab Lee, Gyeonggi-do (KR); Kyoungup Kim, Gyeonggi-do (KR); Chaehoon Lim, Gyeonggi-do (KR); Dusun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/813,140

(22) Filed: Mar. 9, 2020

(65) Prior Publication Data

US 2020/0293460 A1 Sep. 17, 2020

(30) Foreign Application Priority Data

Mar. 15, 2019 (KR) .................. 10-2019-0029963

(51) Int. Cl.
*G06F 13/10* (2006.01)
*G06F 13/40* (2006.01)
(Continued)

(52) U.S. Cl.
CPC ............ *G06F 13/102* (2013.01); *G06F 13/20* (2013.01); *G06F 13/4022* (2013.01); *G06F 13/42* (2013.01)

(58) Field of Classification Search
CPC ........ G06F 13/20; G06F 13/102; G06F 13/42; G06F 13/4022; G06F 13/385;
(Continued)

(56) References Cited

U.S. PATENT DOCUMENTS 8,078,787 B2 * 12/2011 Lydon .................... H04L 69/18
710/315
9,135,188 B2 * 9/2015 Golembeski ........ G06F 13/4221
(Continued)

FOREIGN PATENT DOCUMENTS

CN 107220206 A 9/2017
JP 08-234878 A 9/1996
(Continued)

OTHER PUBLICATIONS

International Search Report dated May 28, 2020.

*Primary Examiner* — Brian T Misiura
(74) *Attorney, Agent, or Firm* — Cha & Reiter, LLC

(57) ABSTRACT

In one embodiment, an electronic device controls an external conversion device connected to an external device. The electronic device includes a connection terminal formed on a portion of an outer surface thereof, a first converter connected to the connection terminal and configured to convert signals, and a processor operatively connected to the first converter. The processor is configured, when the external conversion device is connected to the connection terminal, and the external device is connected to the external conversion device, to identify a type of the external device connected to the external conversion device by receiving an operation signal of the external device through the external conversion device, the connection terminal, and the first converter, and to input or output a signal corresponding to the external device through the external conversion device.

20 Claims, 6 Drawing Sheets

(51) Int. Cl.
*G06F 13/42* (2006.01)
*G06F 13/20* (2006.01)

(58) Field of Classification Search
CPC .. G06F 13/4282; G06F 13/10; G06F 13/4068; G06F 13/4081; G06F 1/162; G06F 11/3051; G06F 2213/0042
USPC .......................................................... 710/8
See application file for complete search history.

(56) References Cited

U.S. PATENT DOCUMENTS

| | | | | |
|---|---|---|---|---|
| 9,389,644 | B2* | 7/2016 | Kim | G06F 1/1654 |
| 9,736,567 | B2* | 8/2017 | Keskin | H04M 1/72527 |
| 9,753,827 | B2* | 9/2017 | Kim | G06F 1/28 |
| 9,857,842 | B2* | 1/2018 | Eliyahu | G06F 1/1632 |
| 9,977,460 | B2* | 5/2018 | Wagman | G06F 3/0202 |
| 10,261,934 | B2* | 4/2019 | Lim | H01R 24/64 |
| 10,452,584 | B2* | 10/2019 | Sachs | G06F 13/4081 |
| 10,635,624 | B2* | 4/2020 | Kadgi | G06F 13/4282 |
| 2010/0235551 | A1* | 9/2010 | Batish | G06F 3/0227 710/72 |
| 2011/0078345 | A1 | 3/2011 | Lee et al. | |
| 2016/0026551 | A1* | 1/2016 | Kim | G06F 11/3041 713/340 |
| 2017/0127203 | A1* | 5/2017 | Ryu | H04R 5/04 |
| 2018/0206705 | A1 | 7/2018 | Chan et al. | |
| 2020/0311004 | A1* | 10/2020 | Ko | H04M 1/6058 |
| 2021/0160618 | A1 | 5/2021 | Chun et al. | |

FOREIGN PATENT DOCUMENTS

| | | |
|---|---|---|
| KR | 10-0618780 B1 | 8/2006 |
| KR | 10-2016-0011392 A | 2/2016 |
| KR | 10-2020-0000268 A | 1/2020 |

\* cited by examiner

ELECTRONIC DEVICE FOR CONTROLLING EXTERNAL CONVERSION DEVICE

CROSS-REFERENCE TO RELATED APPLICATION(S)

This application is based on and claims priority under 35 U.S.C. 119 to Korean Patent Application No. 10-2019-0029963, filed on Mar. 15, 2019, in the Korean Intellectual Property Office, the disclosures of which are herein incorporated by reference in their entireties.

BACKGROUND

Field

One or more embodiments of the instant disclosure generally relate to an electronic device that controls an external conversion device connected to an external device.

Description of Related Art

With the growth of various technologies, a great variety of portable electronic devices such as smart phones, tablet PCs, and e-book readers have been popularized.

These electronic devices may generally include an interface or connector (e.g., a connection hole) for connecting to, for example, an auxiliary device (e.g., an ear jack or plug of a pair of earphones). For example, when the ear jack of the earphones is inserted into the connection hole, the electronic device may output an audio signal to the user via the earphones. The earphones may also include a microphone for receive the user's voice input during a phone call.

When one such auxiliary device (hereinafter also referred to as an external device) is connected to the electronic device through the interface (hereinafter also referred to as the connector), the electronic device can provide one or more functions utilizing the auxiliary device.

However, when the ear jack of the earphones and the connector of the electronic device are of different standards, an adapter (hereinafter also referred to as an external conversion device) is required therebetween. For example, in order to connect a 3.5 mm ear jack to a USB-C type connector, a suitable adapter or dongle is interposed between the ear jack and the connector. But when the ear jack is connected to the connector through such an adapter, the ear jack may occupy the connector such that a charging cable cannot be connected to the connector. As such, while the earphones are connected, the user may not be able to charge the electronic device.

SUMMARY

According to an embodiment of the disclosure, an electronic device for controlling an external conversion device may include a connection terminal formed on a portion of an outer surface of the electronic device and including a ground terminal, a first signal terminal for receiving an input signal from the external conversion device or transmitting an output signal of the electronic device, and/or a power terminal for supplying power to the external conversion device; a first converter connected to the connection terminal and configured to convert signals; and a processor operatively connected to the first converter. The processor may be configured, when the external conversion device is connected to the connection terminal, and an external device is connected to the external conversion device, to identify a type of the external device connected to the external conversion device by receiving an operation signal of the external device through the external conversion device, the connection terminal, and the first converter, and to input or output a signal corresponding to the external device through the external conversion device.

According to an embodiment of the disclosure, an apparatus may include a connection terminal formed on a portion of an outer surface of an electronic device; an input device configured to receive a user input; a first converter connected to the connection terminal and configured to convert signals; and a processor operatively connected to the first converter. The processor may be configured to, based on a signal of the input device, enable the first converter to receive first data for a first time interval through the connection terminal and transmit second data for a second time interval.

According to an embodiment of the disclosure, an electronic device may include at least one connection pin formed on a portion of an outer surface of the electronic device; a converter connected to the at least one connection pin and configured to convert signals; a connector formed on another portion of the outer surface; and a processor operatively connected to the converter. The processor may be configured, when an external device is connected to the connector, to receive an operation signal of the external device through the connector, to identify a type of the external device connected to the connector, and to output a signal corresponding to the external device.

Aspects of the disclosure are to address at least the above-mentioned problems and/or disadvantages and to provide at least the advantages described below. Other aspects, advantages, and salient features of the disclosure will become apparent to those skilled in the art from the following detailed description, which, taken in conjunction with the annexed drawings, discloses an embodiment of the disclosure.

BRIEF DESCRIPTION OF THE DRAWINGS

The above and other aspects, features and advantages of certain embodiments of the disclosure will be more apparent from the following detailed description, taken in conjunction with the accompanying drawings.

In the drawings, the same or similar reference numerals may be used for the same or similar components.

DETAILED DESCRIPTION

One or more embodiments of the instant disclosure may provide an electronic device capable of identifying an external device connected to the electronic device through an external conversion device and controlling the external conversion device. The external device, for example, may be earphones or a keyboard.

Now, embodiments of the disclosure will be described in detail with reference to the accompanying drawings.

Figure 1:
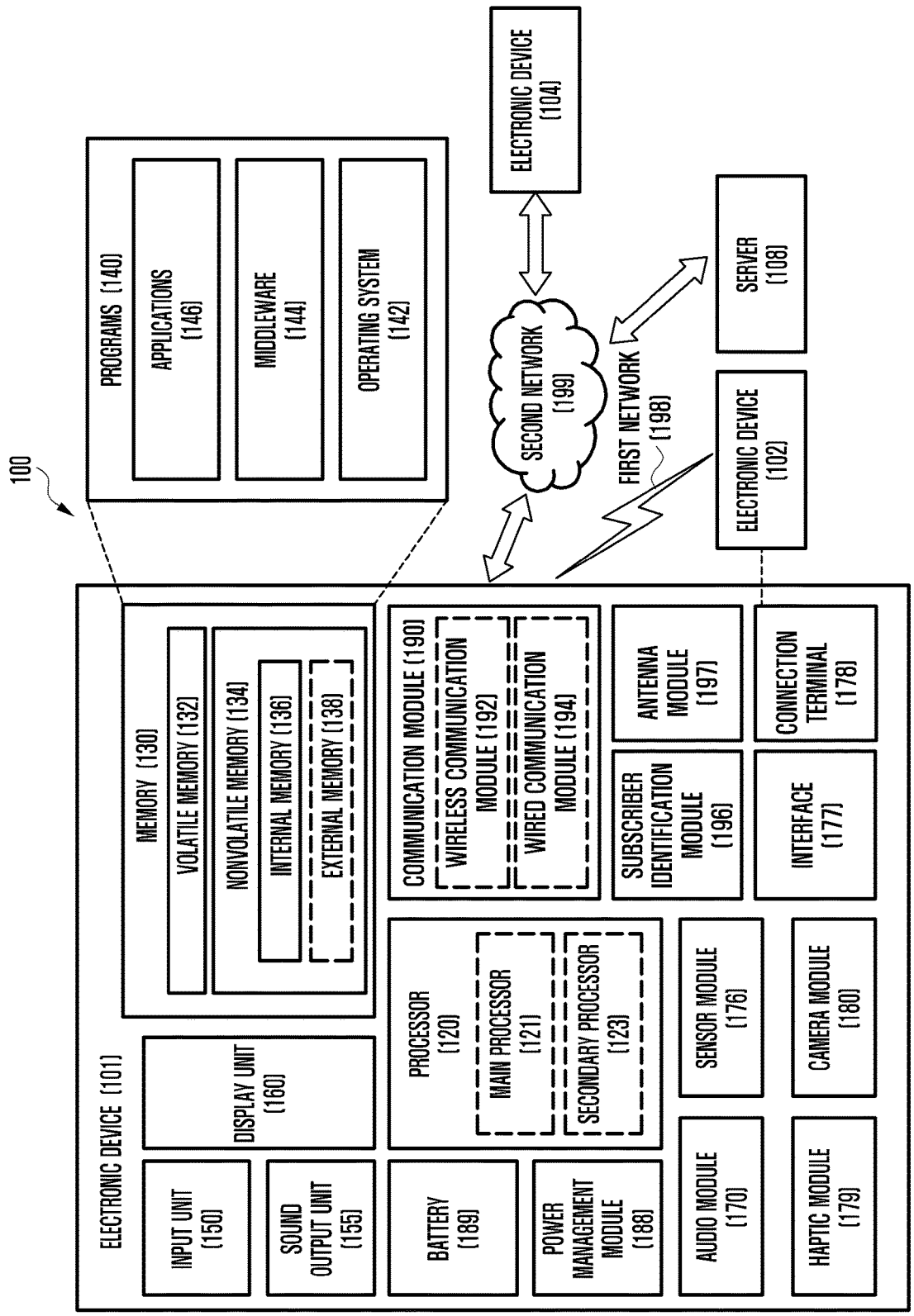
FIG. 1 is a block diagram illustrating an electronic device in a network environment according to various embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit/receive a signal or power to/from an external entity (e.g., an external electronic device). According to some embodiments, the antenna module 197 may be formed of a conductor or a conductive pattern and may further include any other component (e.g., RFIC). According to an embodiment, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
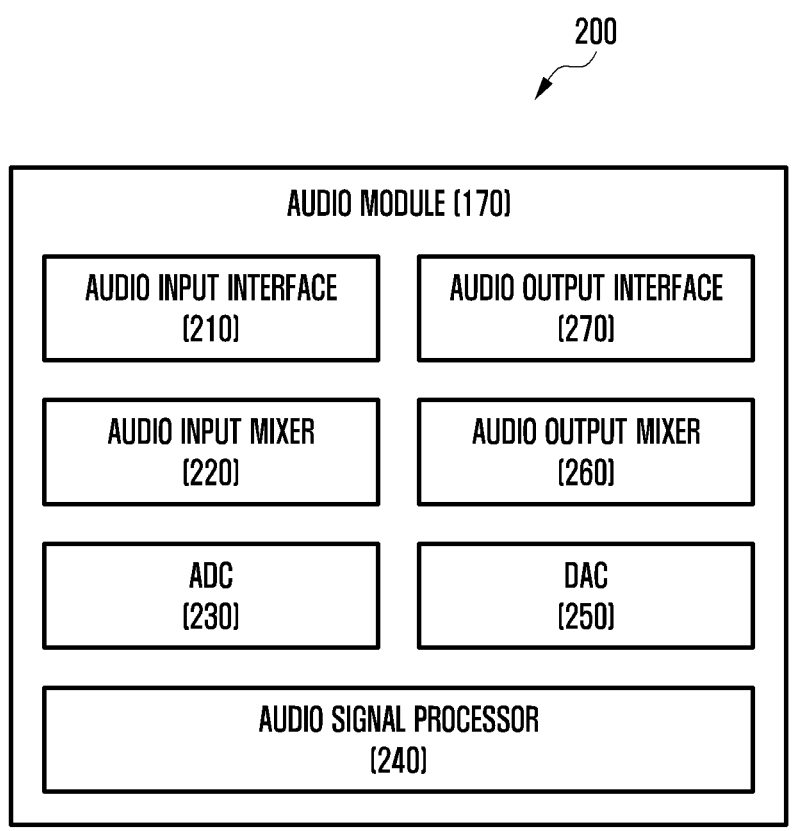
FIG. 2 is a block diagram illustrating an audio module according to various embodiments.

FIG. 2 is a block diagram 200 illustrating the audio module 170 according to various embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device according to certain embodiments may be one of certain types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
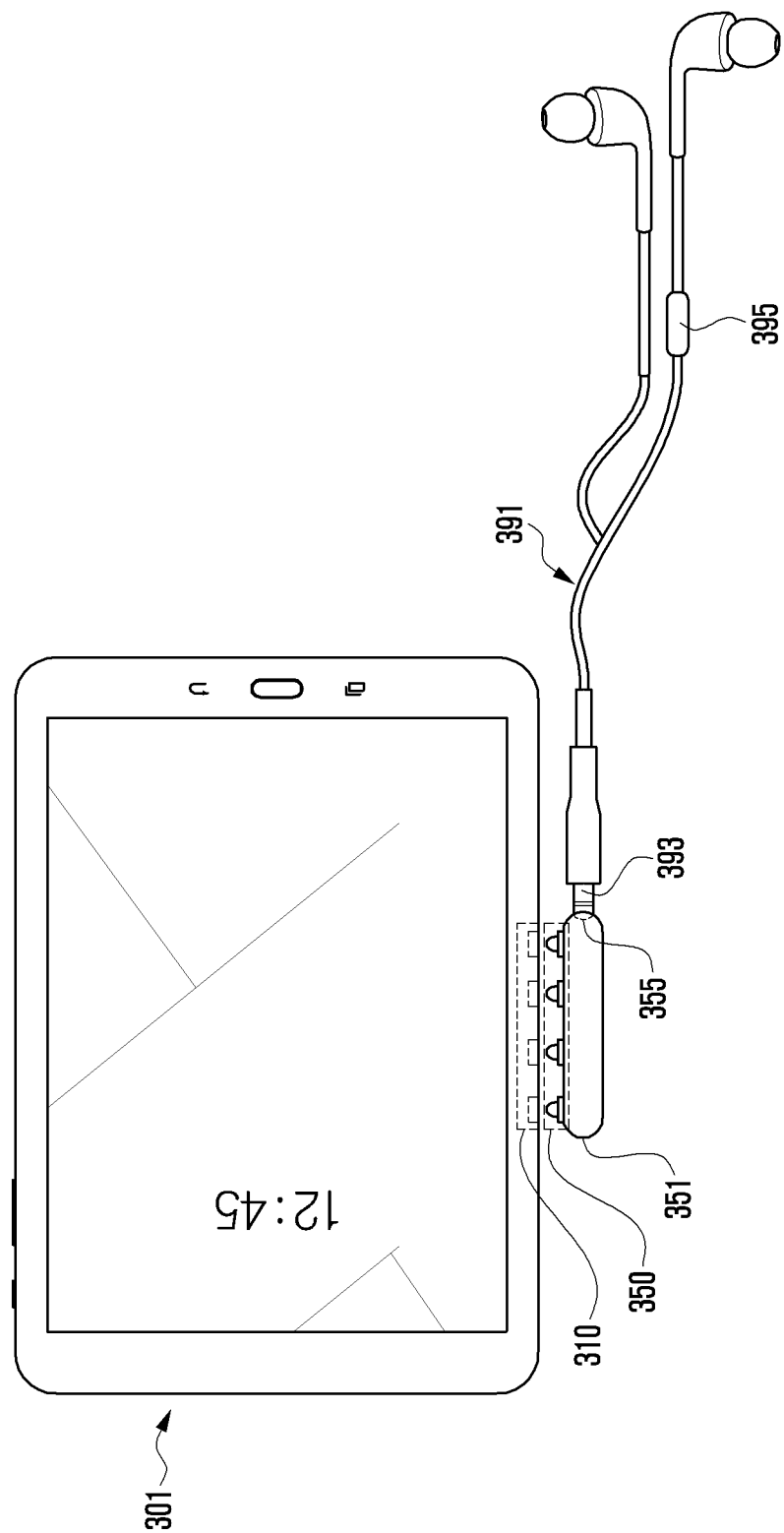
FIG. 3 is a view illustrating an example of a connection between an electronic device and an external conversion device according to an embodiment of the disclosure.

FIG. 3 is a view illustrating an example of a connection between an electronic device and an external conversion device according to an embodiment of the disclosure.

Referring to FIG. 3, the electronic device 301 (e.g., the electronic device 101 in FIG. 1) according to an embodiment may include at least one connection terminal 310 (e.g., the connection terminal 178 in FIG. 1) on a portion of the outer surface thereof (e.g., a lateral surface). Also, the electronic device 301 may include a charging port (not shown) on another portion of the outer surface thereof (e.g., a lower surface).

According to an embodiment, the external conversion device 351 may include at least one connection pin 350 on a portion of the outer surface thereof (e.g., an upper surface). Also, the external conversion device 351 may include a connector 355 connected to an ear jack 393 of earphones 391 on another portion of the outer surface thereof (e.g., a lateral surface).

According to an embodiment, the at least one connection terminal 310 of the electronic device 301 and the at least one connection pin 350 of the external conversion device 351 may be detachably connected with each other.

According to an embodiment, the ear jack 393 of the earphones 391 may be connected to the connector 355 of the external conversion device 351. The earphones 391 may include a microphone 395.

Figure 4:
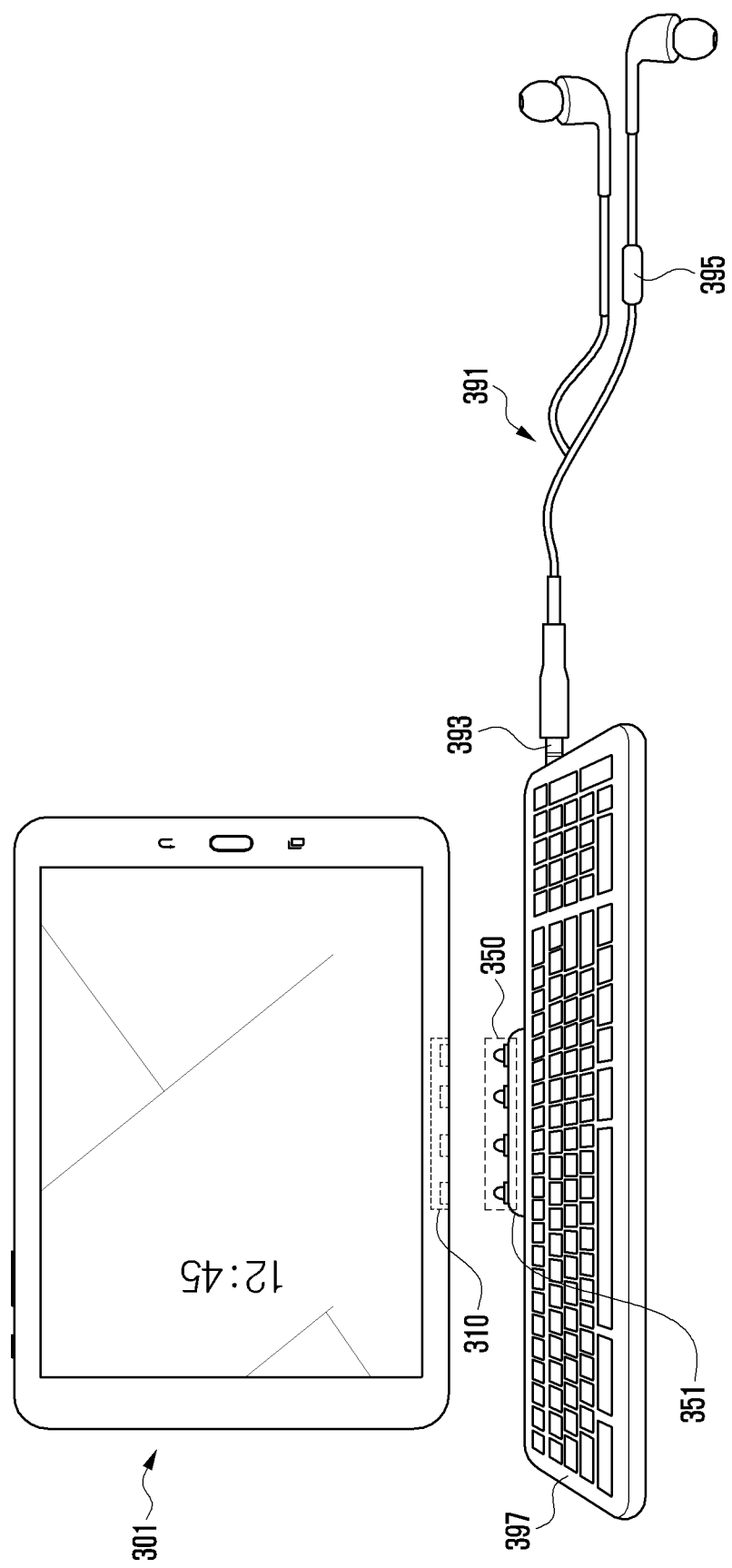
FIG. 4 is a view illustrating another example of a connection between an electronic device and an external conversion device according to an embodiment of the disclosure.

FIG. 4 is a view illustrating another example of a connection between an electronic device and an external conversion device according to an embodiment of the disclosure.

Referring to FIG. 4, the electronic device 301 (e.g., the electronic device 101 in FIG. 1) according to an embodiment may include the at least one connection terminal 310 (e.g., the connection terminal 178 in FIG. 1) on a portion of the outer surface thereof (e.g., a lateral surface). Also, the electronic device 301 may include the charging port (not shown) on another portion of the outer surface thereof (e.g., a lower surface).

According to an embodiment, the external conversion device 351 may include the at least one connection pin 350 on a portion of the outer surface thereof (e.g., an upper surface).

According to an embodiment, the at least one connection terminal 310 of the electronic device 301 and the at least one connection pin 350 of the external conversion device 351 may be detachably connected with each other.

According to an embodiment, the external conversion device 351 may be connected to a keyboard 397. The keyboard 397 may be connected to the ear jack 393 of the earphones 391. In this case, the keyboard 397 may include a connector (like the connector 355 in FIG. 3) on a portion of the outer surface thereof (e.g., a lateral surface). The earphones 391 may include the microphone 395. The keyboard 397 may be an input device that receives user inputs.

Although FIGS. 3 and 4 show that the electronic device 301 is directly connected to the external conversion device 351 without any additional accessory, this is not necessarily the case. For example, the electronic device 301 may be connected to the external conversion device 351 through a case accessory (not shown) sometimes called a book cover. In addition, although FIGS. 3 and 4 show that the external device (e.g., the earphones 391 or the keyboard 397) is a separate device from the external conversion device 351, the external device may be integrated with the external conversion device 351.

Figure 5:
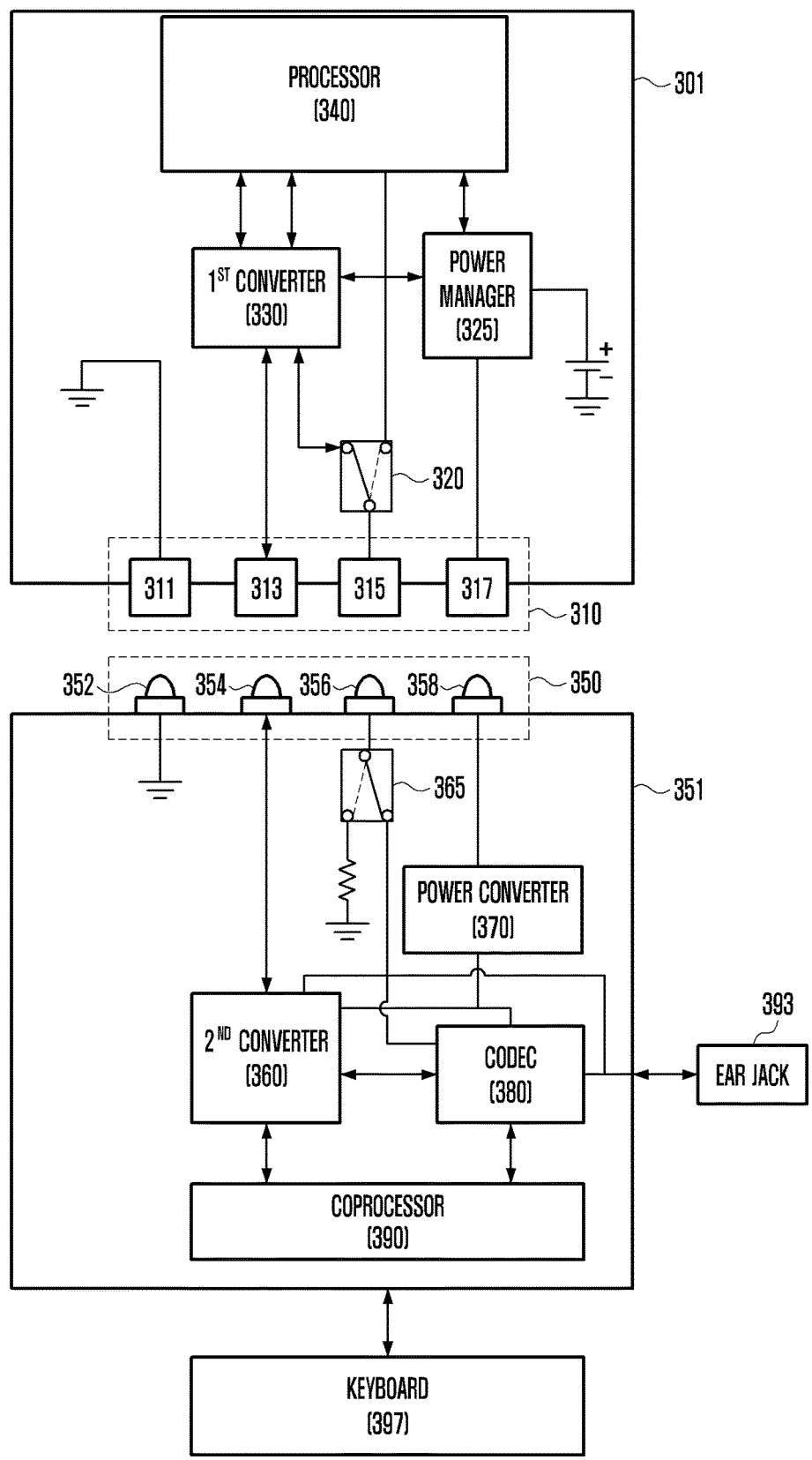
FIG. 5 is a block diagram schematically illustrating configurations of an electronic device and an external conversion device according to an embodiment of the disclosure.

FIG. 5 is a block diagram schematically illustrating configurations of an electronic device and an external conversion device according to an embodiment of the disclosure.

Referring to FIG. 5, the electronic device 301 according to an embodiment may include connection terminals 310, a first switch 320, a power manager 325, a first converter 330, and a processor 340.

According to an embodiment, the connection terminals 310 may provide a physical and electrical connection between the electronic device 301 and the external conversion device 351. The connection terminals 310 may include a POGO contact. Also, the connection terminals 310 may implement various interfaces such as earphone interface, keyboard interface, Universal Serial Bus (USB) interface, High-Definition Multimedia Interface (HDMI), etc.

According to an embodiment, the connection terminals 310 (e.g., the connection terminal 178 in FIG. 1) may include a GND terminal 311, a signal terminal 313, an ID terminal 315, and/or a power terminal 317.

According to an embodiment, the GND terminal 311 refers to a ground terminal. The signal terminal 313 may receive signal or data from the external conversion device 351 and/or transmit signal or data of the electronic device 301. The signal terminal 313 may be referred to as a first signal terminal. The ID terminal 315 may receive an operation signal of the external device (e.g., the earphones 391 and/or the keyboard 397) through the external conversion device 351 and transmit the received signal to the processor 340. The ID terminal 315 may be referred to as a second signal terminal. The power terminal 317 may supply power to the external conversion device 351.

According to an embodiment, the first switch 320 may selectively connect the ID terminal 315 to the processor 340 or the first converter 330. That is, the first switch 320 may form an electrical path between the ID terminal 315 and the processor 340 or an electrical path between the ID terminal 315 and the first converter 330. Additionally or alternatively, the first switch 320 may form an electrical path between the ID terminal 315 and the power manager 325.

According to an embodiment, the power manager 325 (e.g., the power management module 188 in FIG. 1) may manage power supplied to the electronic device 301. The power manager 325 may include a power management integrated circuit (PMIC) and a charger integrated circuit (IC). The power manager 325 may further include a battery or power gauge. For example, when the electronic device 301 is turned on, the power manager 325 may supply power of the battery to other components (e.g., the processor 340 and the first converter 330) of the electronic device 301 as well as the external conversion device 351. Therefore, a first end of the power manager 325 may be connected to the power terminal 317, and a second end may be connected to the processor 340 and the first converter 330. In addition, the power manager 325 may supply power to the external conversion device 351 through the power terminal 317. In turn, the external conversion device 351 may transmit the supplied power to the external device (e.g., the earphones 391 and/or the keyboard 397).

According to an embodiment, when the external conversion device 351 is connected to the electronic device 301, the processor 340 may receive an operation signal of the external device (e.g., the earphones 391 or the keyboard 397) from the external conversion device 351 through the ID terminal 315, and identify the external device (e.g., the earphones 391 or the keyboard 397) connected to the external conversion device 351. Then, the processor 340 may output a signal corresponding to the identified external device (e.g., the earphones 391 or the keyboard 397). This signal from the processor 340 may contain information related to the type or function of the external device.

According to an embodiment, the operation signal of the external device may refer to a signal that the external conversion device 351 receives from the external device (e.g., the earphones 391 or the keyboard 397) when the external device is operating. For example, the operation signal of the external device may include an audio signal detected by the microphone 395 of the earphones 391 or a typing signal inputted through the keyboard 397.

According to an embodiment, when the external device (e.g., the earphones 391 or the keyboard 397) is connected to the external conversion device 351, a coprocessor 390 of the external conversion device 351 may identify the type of the external device and transmit an operation signal of the identified external device to the electronic device 301 through a signal pin 354 and the signal terminal 313.

According to an embodiment, the processor 340 may also output an operation signal corresponding to the identified external device (e.g., the earphones 391 or the keyboard 397) to the external conversion device 351 through the ID terminal 315 and an ID pin 356. For example, when the external conversion device 351 is connected to the electronic device 301, the processor 340 may transmit an operation signal (e.g., audio signal) to the external conversion device 351 and the connected external device (e.g., the earphones 391) through the ID terminal 315.

According to an embodiment, the first converter 330 may convert signals. The first converter 330 may implement various protocols, such as audio signal protocols (e.g., integrated interchip sound (I2S)), 1-wire communication protocol, or device-to-device protocols (e.g., an inter-integrated circuit (I2C)). The first converter 330 may include a codec.

According to an embodiment, the first converter 330 may convert analog signals into digital signals, convert audio signals into digital signals, convert digital signals into other digital signals, and/or convert digital signals into analog signals. A first end of the first converter 330 may be connected to the signal terminal 313, and a second end of the first converter 330 may be connected to the processor 340. The first converter 330 may be electrically connected to the power manager 325.

According to an embodiment, the processor 340 is electrically connected to the connection terminals 310, the first switch 320, the power manager 325, and the first converter 330, and may control each of these components to perform various functions and to process data. The processor 340 may include, for example, at least one of a central processing unit (CPU), an application processor, and a communication processor. The processor 340 may be a single core processor or a multi-core processor, and may be composed of a plurality of processors. The processor 340 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 340 may identify the external device (e.g., the earphones 391 or the keyboard 397) by using an operation signal of the external device received through the external conversion device 351. The processor 340 may control the first converter 330 to convert an audio signal of the electronic device 301 into a digital signal.

According to an embodiment, the connection terminals 310 of the electronic device 301 may be connected to the connection pin 350 of the external conversion device 351, which in turn is connected to the external device (e.g., the earphones 391 or the keyboard 397). In this case, the processor 340 may be configured to receive an operation signal of the external device inputted through the connection pin 350, identify the type of the external device, and output a signal corresponding to the identified external device.

According to an embodiment, the processor 340 may be configured to enable the first converter 330 to receive first data (e.g., keyboard data) during a first time interval from the external device (e.g., the earphones 391 or the keyboard 397) through the connection terminals 310, based on a signal of the external conversion device 351. The processor 340 may also transmit second data (e.g., audio data) during a second time interval.

According to an embodiment, the electronic device 301 may further include the memory 130 as shown in FIG. 1. The memory 130 may store information about the operation signal of the external device such as the earphones 391 or the keyboard 397. The memory 130 may store a program for processing and controlling the processor 340, an operating system (OS), various applications, and input/output data. The memory 130 may store a program for controlling the overall operation of the electronic device 401.

Referring to FIG. 5, the external conversion device 351 according to an embodiment may include connection pins 350, a second converter 360, a second switch 365, a power converter 370, a codec 380, and a coprocessor 390.

According to an embodiment, the connection pins 350 may provide a physical and electrical connection between the electronic device 301 and the external conversion device 351. The connection pins 350 may be connected to the connection terminals 310 of the electronic device 301.

According to an embodiment, the connection pins 350 may include a GND pin 352, a signal pin 354, an ID pin 356, and/or a power pin 358.

According to an embodiment, the GND pin 352 may be connected to the GND terminal 311. The signal pin 354 may be connected to the signal terminal 313. The signal pin 354 may be referred to as a first signal pin. The ID pin 356 may be connected to the ID terminal 315. The ID pin 356 may be referred to as a second signal pin. The power pin 358 may be connected to the power terminal 317.

According to an embodiment, the second converter 360 may convert signals. The second converter 360 may implement various protocols, such as audio signal protocols (e.g., integrated interchip sound (I2S)), 1-wire communication protocol, or device-to-device protocols (e.g., an inter-integrated circuit (I2C)).

According to an embodiment, the second converter 360 may convert digital signals into analog signals, convert digital signals into audio signals, convert digital signals into other digital signals, and/or convert analog signals into digital signals. One first end of the second converter 360 may be connected to the signal pin 354, and another first end may be connected to the second switch 365. In addition, a second end of the second converter 360 may be connected to the codec 380.

According to an embodiment, the second switch 365 may selectively connect the ID pin 356 to the ground or the second converter 360. That is, the second switch 365 may form an electrical path between the ID pin 356 and the ground or an electrical path between the ID pin 356 and the second converter 360. Additionally, the second switch 365 may be connected to the codec 380. The codec 380 may be connected to the external device (e.g., the ear jack 393 of the earphones 391).

According to an embodiment, the power converter 370 may convert power received from the electronic device 301. For example, the power converter 370 may convert a voltage (e.g., approximately 5V) received from the electronic device 301 into another voltage (e.g., approximately 3.3V) required for driving the external conversion device 351. A first end of the power converter 370 may be connected to the power pin 358, and a second end of the power converter 370 may be connected to both the codec 380 and the second converter 360 in order to power the codec 380 and the second converter 360. The power converter 370 may include, for example, a low dropout regulator (LDO).

According to an embodiment, the codec 380 may convert audio signals into digital signals, convert digital signals into audio signals, convert analog signals into digital signals, and/or convert digital signals into analog signals. A first end of the codec 380 may be connected to the second converter 360, and a second end may be connected to the power converter 370.

According to an embodiment, the external conversion device 351 may include the audio module 170 as shown in FIG. 2. The external conversion device 351 may be connected to the ear jack 393 of the earphones 391 as shown in FIG. 3. The external conversion device 351 may receive an audio signal from the microphone 395 of the earphones 391 through the ear jack 393. The external conversion device 351 may output an audio signal of the electronic device 301 to the earphones 391 through the ear jack 393. The external conversion device 351 may be connected to the keyboard 397 as shown in FIG. 4. The electronic device 301 may identify the external device (e.g., the earphones 391 or the keyboard 397) connected to the external conversion device 351 by using an operation signal of the external device.

According to an embodiment, the coprocessor 390 is electrically connected to the connection pins 350, the second converter 360, the second switch 365, the power converter 370, and the codec 380, so that it may control these components to perform functions and to process data. The coprocessor 390 may include, for example, at least one of a central processing unit (CPU), an application processor, and a communication processor. The coprocessor 390 may be formed of a single core processor or a multi-core processor, and may be composed of a plurality of processors.

According to an embodiment, the coprocessor 390 may identify the external device (e.g., the earphones 391 or the keyboard 397) connected to the connector 355.

According to an embodiment, when the external device (e.g., the earphones 391 or the keyboard 397) is connected to the connector 355, the coprocessor 390 may receive an operation signal of the external device through the connector 355 and thereby identify the type of the external device.

According to an embodiment, when the external device (e.g., the earphones 391 or the keyboard 397) is connected to the connector 355, the coprocessor 390 may request the electronic device 301 to transmit a signal corresponding to the external device. Then, the coprocessor 390 may transmit or receive first data (e.g., keyboard data) or second data (e.g., audio data) to or from the electronic device 301 for a predetermined time interval.

Now, operations of the electronic device 301 when the external device (e.g., the ear jack 393 of the earphones 391 or the keyboard 397) is connected to the external conversion device 351 will be described.

According to an embodiment, the electronic device 301 may be connected to the connection pins 350 of the external conversion device 351 through the connection terminals 310. The external conversion device 351 may be connected to the ear jack 393 of the earphones 391 or the keyboard 397. An audio signal processed through the earphones 391 having the ear jack 393 may operate at about 300 KHz or more. A typing signal processed through the keyboard 397 may operate at about 100 kHz or less.

According to an embodiment, the second converter 360 of the external conversion device 351 may convert the operation signal of the earphones 391 or the keyboard 397 into a digital signal. Then, the resultant digital signal may be transmitted to the processor 340 through the second switch 365, the ID pin 356, the ID terminal 315, and the first switch 320. The processor 340 may identify the external device (e.g., the earphones 391 or the keyboard 397) connected to the external conversion device 351, based on the received digital signal. After identifying the external device connected to the external conversion device 351, the processor 340 may control the first switch 320 to input or output, for example, an audio signal. For example, after identifying the external device (e.g., the earphones 391 or the keyboard 397), the processor 340 may control the first switch 320 to connect the ID terminal 315 and the first converter 330.

Specifically, operations of the electronic device 301 when the ear jack 393 of the earphones 391 is connected to the external conversion device 351 are as follows.

As described above, the electronic device 301 may identify the earphones 391 connected to the external conversion device 351.

According to an embodiment, the processor 340 of the electronic device 301 may output an audio signal (e.g., under the I2S protocol) to the first converter 330. Then, the first converter 330 may convert the audio signal into a digital signal (e.g., under the 1-wire protocol) and output the resultant digital signal. The outputted digital signal may be transmitted to the second converter 360 of the external conversion device 351 through the signal terminal 313 and the signal pin 354. The second converter 360 may convert the received digital signal (e.g., under the 1-wire protocol) into an audio signal (e.g., under the I2S protocol) and output the resultant audio signal to the codec 380. Then, the codec 380 may convert the received audio signal into an analog signal and transmit the resultant analog signal to the earphones 391 through the ear jack 393.

In addition, the operations of transmitting an audio signal of the microphone 395 to the electronic device 301 through the ear jack 393 connected to the external conversion device 351 are as follows.

As described above, the electronic device 301 may identify the earphones 391 connected to the external conversion device 351.

According to an embodiment, the external conversion device 351 may receive an analog signal from the microphone 395 of the earphones 391 through the ear jack 393. The received analog signal may be converted into an audio signal (e.g., under the I2S protocol) by the codec 380. The resultant audio signal may be converted into a digital signal (e.g., under the 1-wire protocol) through the second converter 360. The resultant digital signal may be transmitted to the first converter 330 through the second switch 365, the ID pin 356, the ID terminal 315, and the first switch 320. The first converter 330 may convert the received digital signal (e.g., under the 1-wire protocol) into an audio signal (e.g., under the I2S protocol) and transmit the resultant audio signal to the processor 340. Using the received audio signal, the processor 340 may perform a telephone call between the electronic device 301 and another external electronic device (e.g., the electronic device 102 or 104 in FIG. 1).

Figure 6:
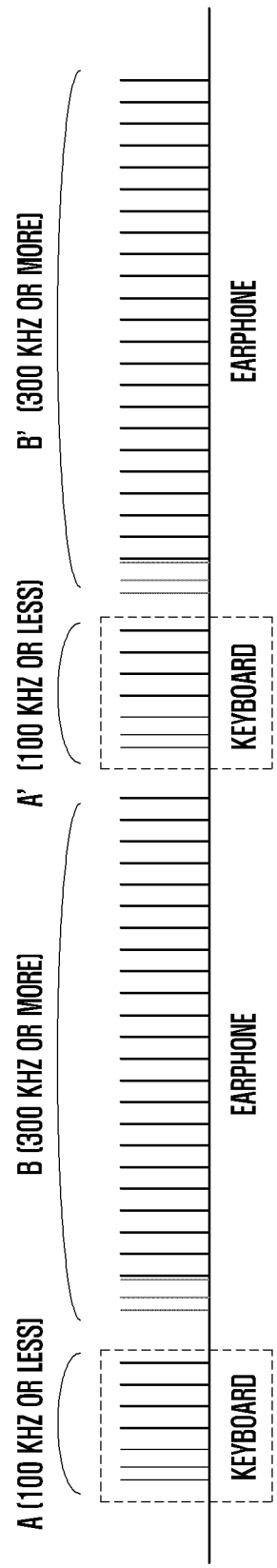
FIG. 6 is a diagram illustrating an operation of identifying an external device (e.g., earphones or a keyboard) connected to an external conversion device at an electronic device according to an embodiment of the disclosure.

FIG. 6 is a diagram illustrating an operation of identifying an external device (e.g., earphones or a keyboard) connected to an external conversion device at an electronic device according to an embodiment of the disclosure.

According to an embodiment, the ear jack 393 of the earphones 391 or the keyboard 397 may be connected to the external conversion device 351.

Referring to FIG. 6, a typing signal of the keyboard 397 may operate at about 100 kHz or less as indicated by section A or A' (e.g., during a first time interval). In addition, an audio signal processed through the earphones 391 may operate at about 300 kHz or more as indicated by section B or B' (e.g., during a second time interval). The keyboard 397 and the earphones 391 may be connected simultaneously to the external conversion device 351 and operate simultaneously.

According to an embodiment, the typing signal of the keyboard 397 and the audio signal of the earphones 391 may be inputted to the external conversion device 351. Then, the external conversion device 351 may transmit both the typing signal and the audio signal to the processor 340 through the ID pin 356, the ID terminal 315, and the first switch 320. Using the typing signal and the audio signal received from the external conversion device 351, the processor 340 may identify the earphones 391 and the keyboard 397 connected to the external conversion device 351.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. An electronic device for controlling an external conversion device, the electronic device comprising:
    a connection terminal formed on a portion of an outer surface of the electronic device and including a ground terminal, a first signal terminal for receiving an input signal from the external conversion device or transmitting an output signal of the electronic device, a second signal terminal for receiving an operation signal of an external device from the external conversion device, and/or a power terminal for supplying power to the external conversion device;
    a first converter connected to the connection terminal and configured to convert signals, wherein the first converter is directly connected to the first signal terminal and selectively connected to the second signal terminal via a first switch; and
    a processor operatively connected to the first converter, wherein, when the external conversion device is connected to the connection terminal, and the external device is connected to the external conversion device, the processor is configured to:
        identify a type of the external device connected to the external conversion device by receiving the operation signal of the external device through the external conversion device, the connection terminal, and the first converter, and input or output a signal corresponding to the external device through the external conversion device, and
wherein the external conversion device includes:
at least one connection pin formed on a portion of an outer surface of the external conversion device and including a ground pin connected to the ground terminal, a first signal pin connected to the first signal terminal, a second signal pin connected to the second signal terminal, and/or a power pin connected to the power terminal; and
a second converter connected to the at least one connection pin and configured to convert signals, wherein the second converter is directly connected to the first signal pin and selectively connected to the second signal pin via a second switch.

2. The electronic device of claim 1, wherein the external conversion device further comprises:
a connector formed on another portion of the outer surface of the external conversion device and configured to connect to the external device.

3. The electronic device of claim 2, wherein the external device is earphones and/or a keyboard.

4. The electronic device of claim 3, wherein the earphones includes an ear jack configured to connect to the connector, and a microphone for outputting an audio signal to the external conversion device.

5. The electronic device of claim 2, wherein the second signal terminal is further configured for transmitting the received operation signal to the processor.

6. The electronic device of claim 5, wherein the external conversion device is configured to receive the operation signal from the external device and transmit the received operation signal to the electronic device through the second signal terminal.

7. The electronic device of claim 5,
wherein the processor is further configured to, after identifying the external device, control the first switch to connect the second signal terminal and the first converter so as to input or output the signal.

8. The electronic device of claim 2, wherein the external conversion device further includes a power converter for converting a voltage received from the electronic device into a voltage required for driving the external conversion device.

9. The electronic device of claim 2, wherein the external conversion device further includes a codec for converting the signal inputted to or outputted from the electronic device.

10. The electronic device of claim 3, wherein the earphones and the keyboard have different operation frequencies.

11. The electronic device of claim 2, wherein the second converter is configured to:
convert the signal to be input to the electronic device from the external device into a digital signal; and
transmit the digital signal to the processor.

12. The electronic device of claim 1, further comprising:
a memory storing information about the operation signal of the external device.

13. The electronic device of claim 1, wherein the electronic device is charged using a charging port and simultaneously performs a function corresponding to the external device.

14. An apparatus comprising:
a connection terminal formed on a portion of an outer surface of an electronic device and including a first signal terminal and a second signal terminal;
an input device configured to receive a user input;
a first converter connected to the connection terminal and configured to convert signals, wherein the first converter is directly connected to the first signal terminal and selectively connected to the second signal terminal via a first switch;
an external conversion device including:
at least one connection pin formed on a portion of an outer surface of the external conversion device and including a first signal pin connected to the first signal terminal and a second signal pin connected to the second signal terminal;
a second converter connected to the at least one connection pin and configured to convert signals, wherein the second converter is directly connected to the first signal pin and selectively connected to the second signal pin via a second switch; and
a processor operatively connected to the first converter,
wherein the processor is configured to, based on a signal of the input device, enable the first converter to receive first data for a first time interval through the connection terminal and transmit second data for a second time interval.

15. The apparatus of claim 14, wherein the external conversion device further comprises:
a connector formed on another portion of the outer surface of the external conversion device and connected to the input device.

16. The apparatus of claim 14, wherein the input device is earphones and/or a keyboard.

17. The apparatus of claim 16, wherein the first data is a typing signal processed at the keyboard, and the second data is an audio signal processed at the earphones.

18. The apparatus of claim 15, wherein when the input device is connected to the connector, the external conversion device requests the electronic device to transmit a signal corresponding to the input device, and the external conversion device receives the first data from the input device and/or receives the second data from the electronic device.

19. An electronic device comprising:
at least one connection pin formed on a portion of an outer surface of the electronic device and including a first signal pin and a second signal pin;
a first converter connected to the at least one connection pin and configured to convert signals, wherein the converter is directly connected to the first signal pin and selectively connected to the second signal pin via a first switch;
a connector formed on another portion of the outer surface; and
a processor operatively connected to the converter,
wherein, when an external device is connected to the connector, the processor is configured to:
receive an operation signal of the external device through the connector,
identify a type of the external device connected to the connector, and
output a signal corresponding to the external device to another external device, and
wherein the other external device includes:
a connection terminal formed on a portion of an outer surface of the other external device and including a first signal terminal connected to the first signal pin and a second signal terminal connected to the second signal pin; and
a second converter connected to the connection terminal and configured to convert signals, wherein the second converter is directly connected to the first signal terminal and selectively connected to the second signal terminal via a second switch.

20. The electronic device of claim 19, wherein:

the external device includes both earphones and a keyboard, a first signal from the earphones and a second signal from the keyboard are transmitted together to the electronic device, and the first signal and the second signal are separated in frequency and in time.

\* \* \* \* \*